UNITED STATES PATENT OFFICE.

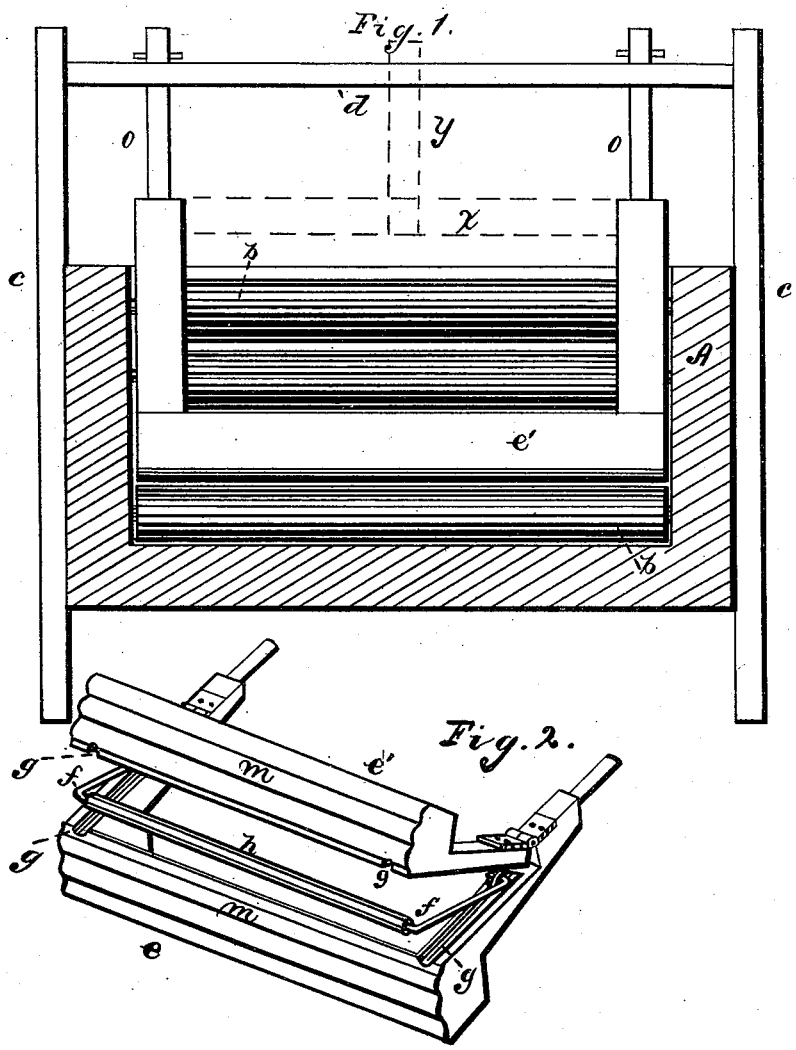

HENRY C. FAGER AND HENRY J. GODWIN, OF WINDSOR, NORTH CAROLINA.

IMPROVEMENT IN WASHING-MACHINES.

Specification forming part of Letters Patent No. 194,812, dated September 4, 1877; application filed August 16, 1877.

*To all whom it may concern:*

Be it known that we, HENRY C. FAGER and HENRY J. GODWIN, of Windsor, in the county of Bertie and State of North Carolina, have made certain new and useful Improvements in Washing-Machines; and we hereby declare the following to be a full, clear, and exact description thereof, reference being had to the accompanying drawings, in which—

Figure 1 is a transverse vertical section of an ordinary trough-shaped washing-machine, taken on a plane a little to one side of the standards and vibrating rubber, so that the said latter-named parts are shown in side elevation. Fig. 2 is a perspective view of the rubber with its jaws in an open position.

Our invention relates to that class of washing-machines in which the clothes to be washed are held between the jaws of a vibrating rubber.

As heretofore constructed but a limited number of pieces could be securely held between the jaws of the rubber at any one time, the effectiveness of its griping power being diminished in proportion to the number of pieces, and consequent thickness of the washing.

To remedy these defects we have devised our present improvement, which consists in an auxiliary holding device hinged or pivoted between two hinged jaws of the vibrating rubber, so that any desired number of pieces to be washed may be suspended between the jaws by means of the said auxiliary device, all as more fully described hereinafter.

A represents the body of the machine; $b$, a series of rollers, arranged within the same with reference to the vibrating rubber which carries the articles to be washed; and $c$ the standards, which support a vibrating cross-piece, $d$. The rubber is adjustably connected with said piece $d$, and is principally composed of two jaws, $e\ e'$, the latter of which is hinged to the extension-pieces or side bars of the jaw $e$, so that it may be swung back when the articles to be washed are introduced between the two.

The device by means of which the articles are suspended between these jaws consists of a bent rod, $f$, pivoted in any suitable way between the two—as, for instance, to the side or extension pieces of the jaw $e$, as shown in Fig. 2.

The side pieces of these two jaws are suitably recessed, as at $g$, so that the two may be snugly closed down upon the rod. The roller $h$ upon this rod may be made of wood or vulcanized rubber, and is preferably loosely mounted thereon.

The articles to be washed are hung over this roller, the jaws then closed down upon the same, and the rubber vibrated in the usual way.

It is evident that a large number of pieces may be thus suspended between the two jaws, and that, as they are held in position in nearly the same plane as that of the corrugated sides $m$ of the said jaws, the washing will be speedily and effectively accomplished.

Instead of securing the rubber to the cross-bar at the upper ends of the side supports by means of the two side bars or extension-pieces, the two may terminate at a cross-bar, and this be connected with the upper vibrating bar by a rod pivoted therein, so that the rubber may be turned at various angles. This will be understood by reference to Fig. 1, in which the dotted lines $x$ indicate the cross-bar connecting the two side pieces or extension-bars of the rubber, and the dotted lines $y$ the single rod which connects the said cross-bar with the upper bar $d$, and which takes the place of the rods $o\ o$. (Shown in full lines.)

What we claim as our invention is—

1. The pivoted holding device $f$, secured between the hinged jaws of the vibrating rubber, substantially as set forth.

2. The hinged jaws $e\ e'$, provided with the recessed side pieces, as set forth, in combination with the holding device $f$, secured between the two, all substantially as herein shown and set forth.

3. The herein-described rubber, pivoted to the upper cross-bar $d$, and provided with the hinged jaws $e\ e'$ and the pivoted holding device $f$, secured between said jaws, the same being arranged to vibrate within the machine, substantially as specified.

In witness whereof we have hereunto set our hands and seals.

HENRY C. FAGER. [L. S.]
HENRY J. GODWIN. [L. S.]

Witnesses:
MOSES GILLAM,
WM. M. SUTTON.